United States Patent Office 3,490,898
Patented Jan. 20, 1970

3,490,898
DETINNING OF TIN SCRAPS
Narasimhan Venkatakrishnan, Roshan Lal Seth, and Prem Behari Mathur, Karaikudi, India, assignors to Council of Scientific and Industrial Research, Rafi Marg, New Delhi, India, a body incorporate of India
No Drawing. Filed July 25, 1967, Ser. No. 655,765
Int. Cl. C22b 25/06
U.S. Cl. 75—98　　　　　　　　　　　　　7 Claims

ABSTRACT OF THE DISCLOSURE

Tin coated iron scrap is detinned by a hydrochloric acid solution containing a minor amount of formaldehyde which inhibits the dissolution of the iron. The tin may then be precipitated, for example, by admixture of the solution with aluminium, zinc or magnesium. The precipitated tin which precipitates in the form of a powder or sponge is then melted with a flux of, for example, aluminium chloride and calcium chloride.

---

This invention relates to the detinning of tin scraps.

Huge quantities of tin scraps accumulate in tin plate industry and are a valuable secondary source of tin metal.

It has hitherto been known to detin tin scrap and to recover tin metal (a) by the chlorine process (b) by the alkali chemical process and (c) by the alkaline electrolytic process.

The hitherto known processes are open to the objections, viz, (a) that they make use of highly complex engineering set up owing to the larger number of operations and controls involved in them; (b) that the alkaline processes are slow and need large space for the reaction units, and/or (c) the capacity of the plants in the alkaline processes is largely controlled by the capacity of the rectifiers used in the plant; all these factors add to the cost of establishment and of running of the plants.

Attempts to detin tin scrap in acid bath hitherto made have not been successful owing to the fact that the acids used for the purpose of dissolving the tin, attack the base metal underneath, giving an acid solution of tin as well as of iron. Since the separation of tin from such a solution containing iron is not economical, commercially successful processes based on acid detinning have not been developed.

The object of the present invention is:

(i) To evolve a simple and economical acid chemical detinning process wherein tin metal dissolves out preferentially, leaving behind the base metal iron uneffected;

(ii) To avoid the use of electric current for the recovery of the tin metal from the detinning mother liquor;

(iii) To increase the rate of reactions for bringing down the time of reaction of the over-all operations of detinning and recovery of the tin metal; and (iv) To bring down the space requirement of the reaction units for improving the capacity of per unit volume of the reaction cell chamber.

We have found:

(i) That chemical detinning of the scrap in acid medium can be rendered practical and economical if an inhibitor which inhibits the dissolution of the base metal iron from going into solution, but which allows the rapid dissolution of tin metal, is added to the acid medium;

(ii) That a dilute solution of formaldehyde serves as an efficient inhibitor;

(iii) That the detinning can be carried out at temperatures much below the boiling point of the acid bath, thereby saving the extra expenditure involved in heating the bath to higher temperatures;

(iv) That the chemical displacement of the tin metal from the detinning mother liquor can be effected by a more basic metal than tin e.g., magnesium, aluminium, zinc or the like;

(v) that the tin sponge obtained in the displacement reaction melts in the presence of a chloride flux to give tin blocks, thereby yielding highly pure tin metal blocks. The flux may consist, for example, of 40% to 90% of ammonium chloride and 60% to 10% of calcium chloride.

As stated, tin can be recovered from the tin scraps by action of a acid provided the attack of the acid on the base metal iron is completely inhibited at the operational temperature. A small amonut—0.5 to 2% of formaldehyde acts as a very efficient inhibitor for the reaction between the acid and the iron. In any acid bath containing an inhibitor dissolves electrolyte thus attacks only tin less than 0.2% of the total weight of the iron passes into the solution. The detinning of scraps can be carried out at quite a fast rate at a temperature of 60° C or even below.

The quantity of the tin scraps which can be detinned in a definite volume of the electrolyte and the time taken for the complete removal of the tin from the scraps depends upon the thickness of the tin coating on the scraps. The tin metal is precipitated out in a more basic metal in the form of sponge, from the detinning mother liquor containing hydrochloric acid and inhibitor, resulting the recovery of tin metal from scrap economical and industrially feasible.

The main steps of a process according to this invention are broadly as follows:

(a) The tin scraps are treated with a solution of hydrochloric acid containing an inhibitor. The hydrochloric acid used may have, for example, a concentration ranging from 5 normal to saturation.

A dilute solution (0.2 to 5%) of formaldehyde is employed as the inhibitor.

(b) The detinning is carried out at temperatures between 30° C. to 90° C., and preferably between 50° C. and 80° C.

As a result of these two steps, the tin will be separated from the base metal and will be available as a solution. If it is desired to recover the tin as metal, the following step is carried out:

The acid solution containing tin is treated with a more basic metal such as magnesium, aluminium or zinc. This will result in the recovery of tin metal as a spongy or powdery substance.

If it is desired that the tin should be obtained in the form of blocks, the following further step is carried out:

(c) the spongy or powdery tin obtained by step (b) is melted in the presence of a chloride flux.

It is obvious that, if desired:

(i) The acid solution obtained by steps (a) and (b) may be further processed in any known manner, e.g. treated with calcium carbonate and an alkali, to recover tin in the form of hydroxide;

(ii) The tin chloride may be precipitated out by adding alkali chlorides in excess; and (iii) Aluminium or like the more basic metal may be recovered from the solution obtained by step (b), as a hydroxide thereof by adding an alkali to the said solution.

EXAMPLE 1

15 litres of commercial hydrochloric acid and 150 ml. of BDH–LR (37/41% by weight/volume) formaldehyde were taken in an ordinary glass container. The resulting solution was heated to 60° C. by means of an immersion heater. 5 kg. of tin scraps were immersed in the vessel and removed after about 30 minutes. The detinned scraps were washed with tap water. In a similar way another 35 kg. of tin scraps were immersed in the same solution contained in the vessel in 7 batches, 5 kg. in each batch, and each time the scraps were kept in the vessel for nearly half an hour till the black surface of iron flashed out. Thus 40 kg. of scraps were detinned in 8 batches within 4 to 5 hours in 15.15 litres of solution maintained at about 60° C. All the tin on the surface of the scraps was dissolved in the solution leaving behind black scrap. The base metal iron remained unattached by the solution.

One litre of the acid detinned solution containing tin metal in the dissolved form was taken in a five litre glass beaker after diluting four times and aluminium scraps were put in the solution. Tin metal precipitated out in the form of floating sponge was separated, washed well with water and dried at a temperature of about 110° C.

The dried powder was melted in presence of chloride flux. The blocks thus obtained were of the order of 99% and higher purity.

The yield of the process was between 80 to 90%. The filtrate obtained after the removal of tin metal was treated with calcium carbonate and sodium hydroxide solution till the whole of the aluminium was precipitated as aluminium hydroxide. The aluminium hydroxide was washed and dried.

EXAMPLE 2

As in Example 1, except that the solution was maintained at room temperature (30 to 32° C.). The same results were obtained, but the time of detinning after 2 batches was much larger than half-an-hour.

EXAMPLE 3

As in Example 1, except that the solution was heated at 70° C. The same results were obtained as in Example 1.

EXAMPLE 4

As in Example 1, except that zinc metal was used in place of aluminium scraps. The same results were obtained as in Example 1 except that the tin metal was dispersed in the solution as metal powder.

EXAMPLE 5

As in Examples 1 and 4, except magnesium metal scrap was used instead of aluminium or zinc. The results were the same.

EXAMPLE 6

As in Example 1, except that the 5 normal hydrochloric acid was used. The similar results were obtained except the time of detinning was increased to a large extent beyond one hour per batch after the first batch.

EXAMPLE 7

As in Example 1, except that .5% of the formaldehyde by volume was used in the solution. Same results were obtained except the content of dissolved iron in the solution was increased.

EXAMPLE 8

As in Example 1, except that 2% of the formaldehyde was used in the solution. Same results were obtained.

EXAMPLE 9

As in Example 1, except that the acid solution was diluted to 6 times. Same results were obtained.

EXAMPLE 10

As in Examples 1 and 9, except that the acid solution was diluted to 2 times. The same results were obtained except that more of the aluminium metal was consumed in the process.

What we claim:

1. A process of detinning tin-coated iron scrap, which comprises contacting the iron scrap with a hydrochloric acid solution containing an effective amount of formaldehyde sufficient to prevent substantial dissolution of iron by the hydrochloric acid, whereby a tin chloride solution is obtained.

2. A process as claimed in claim 1, wherein about 0.5 to 2% of formaldehyde are contained in said hydrochloric acid solution.

3. A process as claimed in claim 1, wherein the hydrochloric acid solution has a hydrochloric acid concentration ranging from about 5 normal to saturation.

4. A process as claimed in claim 1, wherein the contacting of the hydrochloric acid solution with the iron scrap is carried out at a temperature of about between 30 to 90° C.

5. A process as claimed in claim 1, wherein the tin chloride solution obtained is admixed with magnesium, aluminum or zinc, whereby tin precipitates in the form of a sponge or powder and separating the sponge or powder from the solution.

6. A process of preferential chemical dissolution of tin metal from the surface of tin coated iron or steel articles for the recovery of the tin metal in pure metallic form, which comprises treating the tin coated articles in a bath essentially consisting of a mixture of hydrochloric acid and formaldehyde until the coating has been dissolved from the articles, said formaldehyde being present in the mixture in an amount to inhibit substantial dissolution of iron, precipitating tin from the formaldehyde-HCl solution mixture in the form of tin sponge and melting the tin sponge along with a chloride flux consisting of ammonium chloride and calcium chloride, whereby highly pure tin metal ingots are obtained.

7. A process of preferential chemical dissolution of tin metal from the surface of tin coated iron or steel articles for the recovery of the tin metal in pure metallic form, which comprises treating the tin coated articles in a bath consisting of a mixture of hydrochloric acid and formaldehyde until the coating has been dissolved from the article, said formaldehyde being present in the mixture in an amount to inhibit substantial dissolution of iron, precipitating tin from the solution in the form of sponge and melting the precipitated tin sponge with a flux consisting of 40% to 90% of ammonium chloride and 60% to 10% of calcium chloride, whereby pure tin metal ingots are obtained.

References Cited

UNITED STATES PATENTS

| 77,987 | 5/1868 | Kuehn et al. | 75—98 |
|---|---|---|---|
| 148,760 | 3/1874 | Ricketts | 75—98 XR |
| 1,737,140 | 11/1929 | Bischitzky | 23—98 |
| 1,843,060 | 1/1932 | Ashcroft | 23—98 |
| 1,963,893 | 6/1934 | Drouilly | 75—109 |
| 2,011,533 | 8/1935 | Wood | 23—98 XR |
| 2,357,429 | 9/1944 | Saxer et al. | 23—98 XR |
| 3,161,465 | 12/1964 | Horn et al. | 23—98 |
| 3,394,061 | 7/1968 | De Forest et al. | 75—98 XR |
| 2,842,435 | 7/1958 | Milo | 75—98 |

FOREIGN PATENTS

| 23,619 | 1893 | Great Britain. |
|---|---|---|

OTHER REFERENCES

"Autoxidation of Tin Solutions: The Action of Inhibitors" by E. H. Baker, pp. 323 and 327 of J. Applied Chem., July 3, 1963.

EDWARD STERN, Primary Examiner

U.S. Cl. X.R.

23—98, 99, 143; 75—109